United States Patent
Sundén

(10) Patent No.: US 8,460,446 B2
(45) Date of Patent: Jun. 11, 2013

(54) PRODUCTION OF ACIDIC POLYSILICATE PRODUCTS AND THEIR APPLICATION TO STRENGTHEN WOODEN STRUCTURES

(76) Inventors: Olof Sundén, Verbier (CH); Agneta Byléhn Sundén, legal representative, Verbier (CH)

( * ) Notice: Subject to any disclaimer, the term of this patent is extended or adjusted under 35 U.S.C. 154(b) by 0 days.

(21) Appl. No.: 12/451,965

(22) PCT Filed: Jun. 25, 2008

(86) PCT No.: PCT/SE2008/000408
§ 371 (c)(1),
(2), (4) Date: Dec. 10, 2009

(87) PCT Pub. No.: WO2009/008797
PCT Pub. Date: Jan. 15, 2009

(65) Prior Publication Data
US 2011/0011304 A1    Jan. 20, 2011

(30) Foreign Application Priority Data
Jul. 11, 2007 (SE) ........................ 0701684

(51) Int. Cl.
*B27K 3/15*    (2006.01)
*B27K 3/20*    (2006.01)
*B27K 5/06*    (2006.01)
*A01N 59/00*   (2006.01)
*C09D 5/00*    (2006.01)

(52) U.S. Cl.
USPC ............ 106/15.05; 106/18.34; 106/600; 106/627; 106/634; 106/287.1; 424/405

(58) Field of Classification Search
USPC ............ 106/15.05, 18.34, 600, 627, 634, 106/287.1; 424/405
See application file for complete search history.

(56) References Cited

U.S. PATENT DOCUMENTS

| | | | | | |
|---|---|---|---|---|---|
| 2,515,949 | A | * | 7/1950 | Di Maio | 516/87 |
| 3,374,180 | A | * | 3/1968 | Marotta | 516/83 |
| 3,440,175 | A | * | 4/1969 | Weldes et al. | 516/83 |
| 4,612,050 | A | * | 9/1986 | Hicks | 106/18.12 |
| 5,185,037 | A | * | 2/1993 | Kaijou | 106/287.12 |
| 5,808,125 | A | * | 9/1998 | Standke et al. | 556/424 |

FOREIGN PATENT DOCUMENTS

| | | | |
|---|---|---|---|
| GB | 2103682 A | * | 2/1983 |
| JP | 60-4586 A | * | 1/1985 |

* cited by examiner

*Primary Examiner* — Anthony J Green

(57) ABSTRACT

This invention presents a system that produces polysilicate in acidic form that can be used for binding and agglomeration purposes. It also provides a color indicator system to optically identify the optimal pH working range at which, for practical purposes, the polymerization speed is the most convenient. The system also relates to the application of these polysilicic products for preserving wooden structures against aging and rot by reinforcing the cellulose microstructures through filling and binding with acidic polysilicate.

5 Claims, 1 Drawing Sheet

Reactivity of silicate polymerization at different pH using sulphuric acid as the acid in this example. The highlighted (striped) area is showing the pH-range at which an addition of citric acid will provide a yellow coloured solution indicating the optimal working range.
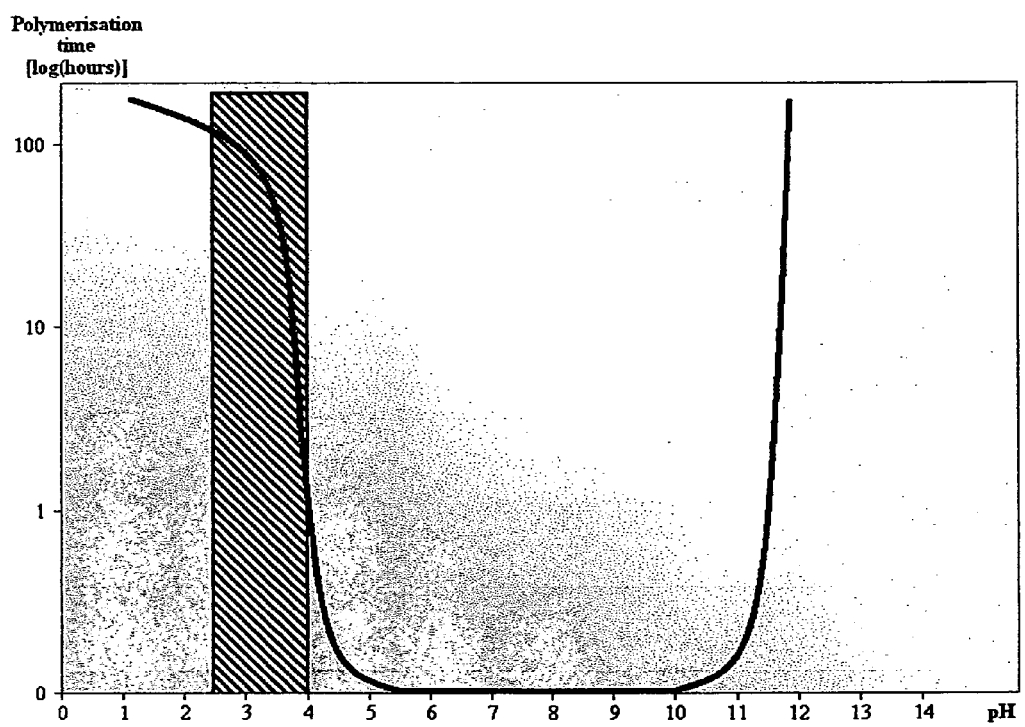

PRODUCTION OF ACIDIC POLYSILICATE PRODUCTS AND THEIR APPLICATION TO STRENGTHEN WOODEN STRUCTURES

BACKGROUND OF THE INVENTION

Liquid silicate (waterglass) is very alkaline with a pH of 14 and is known to rapidly gelate and form polymers when the pH is reduced to values below 10.7. The polymerization products have excellent qualities as a binder, for example metasilicate in alkaline detergents. Being among the most environmentally friendly industrial chemicals and fairly inexpensive, silicates are used in several applications to agglomerate materials. This invention makes use of a system by which silicate polymerisation takes place at low pH ranges and provides a colour indicator for the pH range at which the polymerisation occurs at the most convenient speed for practical purposes.

Wood is normally vulnerable to aging due to environmental influences, rot through micro-organisms and consumption by certain insects. However, there are examples of wooden structures that according to paleo-botany have been preserved for million of years through fossilization processes with silicates. Modern wood preservation involves chemicals that have fungicidal or insecticidal properties. Such wood-treatment products often have unwanted effects on human health and/or the environment, e.g. chromium-arsenic based wood treatment products, organo-phosphate and organo-chlorine insecticides. With inspiration from natural fossilation the present invention also presents a process that reinforces wood by coating and binding the wood-fibres with silicates and thereby helps preserve wood.

SUMMARY OF THE INVENTION

This invention presents a system that produces polysilicate in acidic form that can be used for binding and agglomeration purposes, as well as a colour indicator system that shows the pH range at which, for practical purposes, the polymerisation speed is the most convenient. With this system, gelation of the silicate product occurs after different periods of time at low pH ranges depending on the process components used. It furthermore provides a tool for optically identifying the optimal pH working range by making use of citric acid.

This invention also relates to the application of these acidic polysilicate products for preserving wooden structures. Wood treated with the optimal polysilicic acid product will last longer as its cellulose structure has been reinforced through filling and binding with acidic polysilicate. The resulting treated wood structure will have an improved resistance against aging and rot caused by micro-organisms as well as insect attacks. This process and the resulting wood products constitute a possible complement or alternative method to today's often environmentally unfriendly wood treatment products.

Like other silicate treated wood this system will also have a certain fire retardant effect. Furthermore, the system can prolong the useful life of old wood structures through the binding and agglomeration capacity.

DETAILED DESCRIPTION OF THE INVENTION

This invention relates to strengthening of wooden structures through impregnation with colloidal water solutions of acidic polysilicic acid. Wood products treated in this way can be characterized as having the cellulose structure reinforced through filling and binding with acidic polysilicates. The invention can be used on any wood but is particularly interesting for soft wood such as pine.

The present invention makes use of a colloidal water solution of acidic polysilicic acid to impregnate the wood. The treatment results in a longer lasting binding between the fibres of the treated wood. Tests have demonstrated that the treated wood can withstand normal aging, rot, and attacks from insects and micro-organisms. Tests with termites have demonstrated significantly reduced wood consumption with no significant toxicity towards the termites.

This invention uses a system whereby acidic polysilicate solutions are produced with a variety of acids, both organic and inorganic. The resulting colloidal solutions will polymerize or gelate after different time periods depending on the acid(s), on the pH and on the concentrations used. The preferred way is production from an alkaline water solution of water glass (sodium silicate) and sulphuric acid. To avoid passing through the neutral pH range between 5-8.5, in which the silicate is too reactive and will polymerise too rapidly for practical purposes, the water glass solution should be added to the acid until a pH between 2.5 to 4 is reached, while ensuring that it never exceeds pH4, yielding a solution of polymeric silicic acid that has a more convenient polymerisation speed. It is also possible to add the water glass and the acid solutions simultaneously if this pH range is kept. In order to more easily make use of the optimal pH range of 3.5 to 4 during the production process, citric acid is added in an amount of 1-5% to the sulphuric acid solution, which will provide a colour indicator to the silicic acid solution that will turn yellow at a pH of around 2 and return to colourless when the pH reaches 4 (see diagram in FIG. 1). This yellow colour, which only has been demonstrated in the presence of citric acid, gives a practical indication of the most optimal working range in which for practical handling purposes, the polymerisation will take place at a convenient speed.

Wood treated in this way has an increased water absorption capacity and in order to reduce this, the resulting acidic solution is chilled to near or just reaching its freezing point to allow the sodium be precipitated out as sodium sulphate. The precipitated sodium sulphate can easily be removed for example through filtration and the resulting acidic polysilicate solution is ready for use. If kept cool the solution can be kept for up to 4 days before it will completely polymerise to a gel.

If citric acid is used alone instead of sulphuric acid, the solution will be more stable at higher pH values of up to pH4, which should not be exceeded. However, the resulting sodium citrate will not fall out, which will increase the water absorption capacity of the treated wood. Solutions based on citric acid alone take up to a week to polymerize, which is longer compared to those using sulphuric acid together with citric acid.

Another way of obtaining a lower water absorption capacity of the treated wood product is to add the sodium silicate solution to oxalic acid while ensuring that the pH never exceeds pH4 whereby the resulting sodium oxalate, which has a low water solubility, will precipitate. The precipitate will fall out at a pH of around 1.5 and can easily be removed for example through simple filtration. However, in oxalic acid solutions citric acid will not work as a colour indicator for the optimal pH working range as there is no colour change.

Tests have demonstrated that the treated wood will have an improved resistance to normal aging, rot, and attacks from insects and micro-organisms. Tests with termites have demonstrated significantly reduced wood consumption with no significant toxicity towards the termites. This resistance is due to a strengthening of the microstructures of the wood through the filling and binding of the cellulose fibers with the acidic polysilicate. This invention does hence provide a potential alternative approach to today's often environmentally harmful insecticides used in wood protection, although, the acidic polysilicate does not itself act as an insecticide since it does not kill the insects. This is confirmed in the findings of Example 7 described below since no significant toxicity to termites but rather their preference to untreated wood was demonstrated.

The amount needed to treat the wood will depend on the purpose and method of application—surface treatment through painting or impregnation, either pressurized or not. For surface resistance it can be sufficient with a simple painted layer at concentrations of 5-10% calculated as $SiO_2$.

Newly treated wood will have a slightly whiter appearance than untreated wood while aged wood has a greyer aspect.

BRIEF DESCRIPTION OF THE DRAWINGS

The diagram in FIG. 1 shows the reactivity of silicate polymerization at different pH using sulphuric acid as the acid in this example. The highlighted (striped) area in the diagram indicates the pH range where an addition of citric acid in an amount of 1-5% to the sulphuric acid solution will provide a colour indicator to the silicic acid solution giving a practical indication of the most optimal working range in which for practical handling purposes, the polymerisation will take place at a convenient speed.

EXAMPLES

Example 1

The polymerization period and colour changes at different pH values were recorded for the polysilicic acid using solutions of sulphuric acid (approx. 28%) with citric acid (approx. 1%) and adding silicic acid to approximately 10-15% calculated as $SiO_2$. (With higher concentrations of the polysilicate acid, the shorter is the gelation time for a given pH). Results are presented in Table 1 below.

TABLE 1

| pH | Time of gelation | Comment |
|---|---|---|
| <2.0 | >48 hours | No colour |
| 2.5 | >42 hours | Light yellow |
| <2.75 | ~42 hours | Yellow |
| 3.25 | ~22 hours | Light yellow |
| 3.75-4 | >12 < 22 hours | Very light yellow |
| 4.25-5 | 1-5 minutes | No colour |

Example 2

The polymerization period and colour changes at different pH values were recorded for the polysilicic acid using solutions of citric acid (approx. 20%) and adding silicic acid to approximately 2.5-8% (as $SiO_2$). Results are presented in Table 2 below.

TABLE 2

| pH | Time of gelation | Comment |
|---|---|---|
| <2.5 | >72 hours | No colour |
| 3.25 | >50 < 64 hours | No colour |
| 3.5 | >32 < 42 hours | Light yellow |
| 3.75 | >7 < 14 hours | Yellow |
| 4.0 | ~4 hours | Light yellow |
| 4.5 | 45 minutes | No colour |

Example 3

The polymerization period and colour changes at different pH values were recorded for the polysilicic acid using solutions of hydrochloric acid (approx. 15%) with 1.7% citric acid and adding silicic acid to approximately 8-12% (as $SiO_2$). Results are presented in Table 3 below.

TABLE 3

| pH | Time of gelation | Comment |
|---|---|---|
| .5 | >60 hours | Light yellow |
| 1.5-2 | >48 < 60 hours | Yellow |
| 2.5 | >2 < 9 hours | Light yellow |
| 3.5 | >2 < 9 hours | No colour |
| 3.25 | ~22 hours | No colour |
| 3.75 | >12 < 22 hours | No colour |
| 4-5 | 1-5 minutes | No colour |

Example 4

The polymerization period at different pH values were recorded for the polysilicic acid using solutions of oxalic acid (approx. 20%) and adding silicate to approximately 8-12% (as $SiO_2$). Results are presented in Table 4 below.

TABLE 4

| pH | Time of gelation |
|---|---|
| 1.5 | >34 hours |
| 2.25 | >34 hours |
| 2.5 | >18 < 34 hours |
| 3.5 | <5 hours |
| 4.0 | 2.5 hours |
| 4.5 | 15 minutes |
| 5 | 10 minutes |

Example 5

A first test of resistance against normal aging was performed by painting two layers of polysilicic acid solution (produced with sulphuric acid as the acidic component without any citric acid) on wooden boards on a south-west facing house façade exposed to sunlight and rain, and comparing these with untreated boards on the same façade. The boards were observed over a period of 15 years. The untreated wood had a significant difference in appearance of aging, and after about 15 years most of the non-treated wood was rotten while the treated wood showed no sign of aging, nor rot. 20% of the untreated façade boards had to be replaced during that period, as opposed to none of the treated boards.

Example 6

In a second test of resistance against normal aging, some pieces of plywood were treated by soaking its veneer in the polysilicic acid solution (produced with sulphuric acid as the acidic component without citric acid) and tested for aging together with untreated pieces of plywood. They were horizontally positioned on a house roof during a period of 15 years. On the untreated plywood, the top veneer was totally decomposed and pulverised, while the treated plywood only experienced a change in colour on its top veneer (from brown to grey).

Example 7

Pieces of pine wood (about 2.5×2×1.2 cm) were treated by soaking for approximately 24 hours in acidic polysilicic acid solution produced with sulphuric acid/citric acid as the acidic component. Standard tests for choice between treated and non-treated wood were run with two different sub-terranean termite species. Tunnelling behaviour, wood consumption and survival were observed for 1 month. A significant reduction (about 50-70%) in wood consumption was demonstrated with a 95% confidence limit for the treated versus non-treated wood. No significant reduction in survival was observed while behaviour showed a clear preference towards non-treated wood in one of the two species tested. Furthermore, the experts who carried out the tests claimed that for the non-treated controls, wooden pieces on the right side showed a tendency of being consumed more, possibly due to different heat or light exposure. In the test kits, the treated wooden pieces were on the right side, and should therefore also have been consumed more than the untreated pieces that were on the left side.

With this application we claim:

1. A process for manufacturing an acidic polysilicic solution characterized by the acidic polysilicic solution being produced by adding an alkaline solution of sodium silicate (water glass) to a sulphuric acid solution, while ensuring that the pH never exceeds 4, and having citric acid added in an amount of 1-5% to the sulphuric acid solution to make the pH in the area of 2.5-4 visible through a yellowish colour.

2. A process to reinforce wooden structures and give them greater resistance against aging, rot and insects by surface application or impregnation of the wooden structure with a specific acidic polysilicic solution that has been manufactured according to process specified in claim 1 and kept at a temperature close to or at freezing point to obtain a $Na_2SO_4$ precipitate and by removing this from the solution through filtration attain a treated wood with a reduced $Na_2SO_4$ content and thereby reduce its water absorption capacity.

3. A process for manufacturing an acidic polysilicic solution, intended for reinforcing wooden structures, characterized by the acidic polysilicic solution being produced by adding an alkaline solution of sodium silicate (water glass) to a citric acid solution, while ensuring that the pH never exceeds 4, to obtain a solution that is stable for up to a week.

4. A process to reinforce wooden structures and give them greater resistance against aging, rot and insects by impregnation of the wooden structure with a specific acidic polysilicic solution that has been manufactured according to process specified in claim 3 in order to have an impregnation that can last up to a week.

5. A process to reinforce wooden structures and give them greater resistance against aging rot and insects by surface application or impregnation of the wooden structure with a specific acidic polysilicic solution that has been manufactured by adding an alkaline solution of sodium silicate (water glass) to an oxalic acid solution, while ensuring that the pH never exceeds 4, and removing sodium from the solution through precipitation as sodium oxalate and subsequent removal of the precipitate from the solution and thus obtain a treated wooden structure with a reduced water absorption capacity.

* * * * *